United States Patent [19]

Kikuchi

[11] Patent Number: 5,730,884
[45] Date of Patent: Mar. 24, 1998

[54] METHOD OF REMOVING SELENATE ION FROM SELENATE ION-CONTAINING AQUEOUS WASTE LIQUID

[75] Inventor: Eiji Kikuchi, Tsukuba, Japan

[73] Assignee: Director-General of Agency of Industrial Science and Technology, Japan

[21] Appl. No.: 812,071

[22] Filed: Mar. 6, 1997

[30] Foreign Application Priority Data

Mar. 7, 1996 [JP] Japan .................................. 8-050169

[51] Int. Cl.⁶ ...................................................... C02F 1/48
[52] U.S. Cl. ........................ 210/748; 210/757; 210/911; 210/750
[58] Field of Search ............................ 210/748, 757, 210/763, 911, 718, 750

[56] References Cited

U.S. PATENT DOCUMENTS

| | | | |
|---|---|---|---|
| 4,446,236 | 5/1984 | Clyde | 435/287 |
| 4,615,799 | 10/1986 | Mortensen | 210/117 |
| 4,694,179 | 9/1987 | Lew et al. | 250/431 |
| 4,892,712 | 1/1990 | Robertson et al. | 422/186 |
| 5,118,422 | 6/1992 | Cooper et al. | 210/636 |
| 5,174,877 | 12/1992 | Cooper et al. | 204/193 |
| 5,332,508 | 7/1994 | Foster et al. | 210/711 |
| 5,554,300 | 9/1996 | Butters et al. | 210/757 |

*Primary Examiner*—Neil McCarthy
*Attorney, Agent, or Firm*—Lorusso & Loud

[57] ABSTRACT

Selenate ion is removed from a selenate ion-containing aqueous waste liquid by treating the aqueous liquid with an organic reducing agent in the presence of a photocatalyst while irradiating the aqueous waste liquid with an actinic radiation to convert the selenate ion into elemental selenium which is in the form of solid precipitates and/or hydrogen selenide which is in the form of a gas.

4 Claims, No Drawings

METHOD OF REMOVING SELENATE ION FROM SELENATE ION-CONTAINING AQUEOUS WASTE LIQUID

BACKGROUND OF THE INVENTION

This invention relates to a method of removing selenate ion from a selenate ion-containing aqueous waste liquid.

Waste water discharged from metal smelting and chemical plants often contains selenate ion ($SeO_4$). No industrially effective processes have thus far been proposed for removing selenate ion from waste water. In analytical purposes, a method is known for separating selenate ion in which a selenate ion-containing water is mixed with hydrochloric acid in an amount providing a HCl concentration of at least 10%, the resulting mixture being subsequently boiled. Alternatively, a method is known in which a selenate ion-containing water is mixed with a large amount of iron or zinc powder after the pH thereof has been adjusted to a weakly acidic region. These methods are illsuited for industrial scale treatment, since a large amount of reagents are required and since the treated water must be further treated for neutralization and for tile removal of the metal ions formed in situ.

SUMMARY OF THE INVENTION

It is, therefore, an object of the present invention to provide a simple, economical method for the treatment of a selenate ion-containing waste water which can effectively remove the selenate ion.

In accomplishing the above object, the present invention provides a method of removing selenate ion from a selenate ion-containing aqueous waste liquid, comprising treating said aqueous liquid with a photocatalyst in the presence of an organic reducing agent while irradiating said aqueous waste liquid with an actinic radiation, so that said selenate ion is converted into elemental selenium and/or hydrogen selenide.

The treatment according to the present invention can reduce the amount of selenate ion in waste water to 1 ppm or less and, particularly, 0.1 ppm or less without any significant increase of the concentrations other ingredients.

Other objects, features and advantages of the present invention will become apparent from the detailed description of the preferred embodiments of the invention to follow.

DETAILED DESCRIPTION OF THE PREFERRED EMBODIMENTS OF THE INVENTION

In the present invention, selenate ion in a waste water is converted into solid selenium and/or gaseous hydrogen selenide by reduction with a photocatalyst in the presence of an organic reducing agent with the aid of actinic irradiation.

The organic reducing agent may be an organic compound having an active hydrogen, preferably a water soluble compound, such as an alcohol, a phenol compound or a carboxylic acid. Illustrative of suitable reducing agents are oxalic acid, acetic acid, formic acid, citric acid, methanol, ethanol, a glycol and phenol. The reducing agent is used at least in a stoichiometric amount and generally in an amount of 5–10 equivalents (in terms of oxidation-reduction equivalent) per equivalent of the selenate ion.

Any photocatalyst may be used for the purpose of the present invention. Both water soluble or insoluble phtotocatalysts may be used. Water-insoluble photocatalysts may be semiconductor photocatalysts such as titanium oxide and tungsten trioxide. The water-insoluble photocatalyst may be in the form of powder with a particle size of 1–100 µm, preferably 5–60 µm, or a film. In the case of powder, the catalyst is dispersed in the waste water preferably in an amount of 1–10 g per liter of the waste water. A film of the photocatalyst can be supported on a suitable support such as a plate or tube. A water-soluble photocatalyst may be a water-soluble pigment. The use of water-insoluble photocatalyst is preferred for reasons of easiness in separation.

The actinic radiation may be suitably ultraviolet or visible light. Ultraviolet light having a wavelength in the range of 300–400 nm is preferably used. The irradiation treatment of the waste water is generally performed for 10 or less without any temperature control.

Probably, the reduction of the selenate ion proceeds in the following mechanism. The actinic radiation forms electrons and positive holes on the photocatalyst. The positive holes are used for oxidative decomposition of the organic reducing agent, while the electrons are used for reducing the selenate ion. Through the reduction, the selenate ion is first converted into selenious acid and then into amorphous selenium of metallic selenium. Such solid selenium is further reduced to gaseous hydrogen selenide ($H_2Se$). Thus, by controlling the degree of reduction, the selenate ion can be converted into a solid or gaseous form and, therefore, can be separated from the waste water.

The solid selenium is formed on surfaces of the photocatalyst and, thus, can be separated by any suitable solid-liquid separation technique such as filtration when the photocatalyst is in the form of particles. The photocatalyst having selenium deposited thereon can be regenerated by, for example, washing with nitric acid.

It is preferred that the pH of the waste water is adjusted at about 1–since the reduction of the selenate ion into hydrogen selenide is accelerated. It is also preferred that an inert gas be bubbled through the waste water during the irradiation treatment, since the waste water is stirred and since the hydrogen selenide formed is removed from the waste water together with the inert gas. The hydrogen selenide entraining gas is preferably introduced into an absorption tower and contacted with an aqueous solution containing a heavy metal salt to convert the hydrogen selenide into a heavy metal selenide.

The inert gas may be, for example, nitrogen, argon or helium. The metal salt used for fixing the hydrogen selenide may be an organic or inorganic salt, such as sulfate, chloride, formate, acetate or citrate, of a heavy metal such as Cu, Fe, Zn, Mn, Sn or Co.

The following examples will further illustrate the present invention.

EXAMPLE 1

In a glass vessel, 100 ml of aqueous sodium selenate solution having a selenium content (in terms of elemental selenium) of 100 ppm was charged. The solution was then mixed with 2.5 mmol of formic acid and about 0.1 g of titanium dioxide powder (photocatalyst)- The resulting suspension in the vessel was irradiated with UV light from a 500 W high pressure mercury lamp with stirring while bubbling nitrogen gas through the suspension. The nitrogen gas discharged from the glass vessel was introduced into a pool of an aqueous cupric sulfate solution. The color of the suspension in the glass vessel began changing from white to yellow about 1 minute after the commencement of the irradiation and to red about 5 minutes after the commencement of the irradiation. As the irradiation continued, the red color became deep. After about half an hour from the start of the irradiation, black precipitates of cupric selenide began to generate in the cupric sulfate solution, while the dark red of the suspension in the glass vessel began to turn light. Then the color of the suspension changed to yellow and finally to white. The irradiation was terminated when the mixture turned white. The suspension was then filtered to separate the titanium oxide photocatalyst. The filtrate was found to have a selenium content of about 0.03 ppm. The titanium oxide thus recovered was found to be usable as photocatalyst.

EXAMPLE 2

Example 1 was repeated in the same manner as described except that sodium sulfate was additionally added into the glass vessel in a concentration of 10 mmol/l. The selenium content was found to be reduced to about 0.06 ppm as a result of the treatment. Selenate ion-containing waste water from metal smelting plants generally contain a large amount of sulfate ion. From the above results, it is appreciated that the method according to the present invention is effective even when sulfate ion coexists in the waste water to be treated.

EXAMPLE 3

In a glass vessel, 100 ml of aqueous sodium selenate solution having a selenium content (in terms of elemental selenium) of 100 ppm was charged. The solution was then mixed with 2.5 mmol of methanol, 0.5 mmol of sulfuric acid and about 0.1 g of titanium dioxide powder (photocatalyst). The resulting suspension in the vessel was irradiated with UV light from a 500 W high pressure mercury lamp with stirring while bubbling nitrogen gas through the suspension. The nitrogen gas discharged from the glass vessel was introduced into a pool of an aqueous cupric sulfate solution. The color of the suspension in the glass vessel began changing from white to yellow about 5 minute after the commencement of the irradiation and to red about 30 minutes after the commencement of the irradiation. As the irradiation continued, the red color became deep. Thereafter, black precipitates of cupric selenide began to generate in the cupric sulfate solution, while the dark red of the suspension in the glass vessel began to turn light. The color of the suspension changed to yellow and finally to white. The irradiation was terminated when the mixture turned white. The suspension was then filtered to separate the titanium oxide photocatalyst. The filtrate was found to have a selenium content of about 0.2 ppm. The titanium oxide thus recovered was found no be usable as photocatalyst.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of removing selenate ion from a selenate ion-containing aqueous waste liquid, comprising treating said aqueous liquid with a photocatalyst in the presence of an organic reducing agent while irradiating said aqueous waste liquid with an actinic radiation, so that said selenate ion is converted into elemental selenium and/or hydrogen selenide.

2. A method as claimed in claim 1, wherein said photocatalyst is a solid and wherein said treatment is performed so that said selenate ion is converted into elemental selenium which deposits on said solid photocatalyst, said method further comprising separating said solid photocatalyst on which said elemental selenium deposits from said aqueous liquid.

3. A method as claimed in claim 1, wherein said treatment is performed so that said selenate ion is converted into hydrogen selenide which is in the form of a gas, said method further comprising bubbling an inert gas through said aqueous liquid to purge said hydrogen selenide with said inert gas.

4. A method as claimed in claim 3, further comprising contacting said purged hydrogen selenide with an aqueous solution containing a heavy metal salt to convert said hydrogen selenide into a heavy metal selenide.

* * * * *

UNITED STATES PATENT AND TRADEMARK OFFICE
CERTIFICATE OF CORRECTION

PATENT NO. : 5,730,884
DATED : March 24, 1998
INVENTOR(S) : Eiji KIKUCHI

It is certified that error appears in the above-indentified patent and that said Letters Patent is hereby corrected as shown below:

Col. 1, line 22, "tile" should read --the--.

Col. 2, line 12, after "10" insert --hours--;
       line 34, after "1-" insert --4--.

Col. 4, line 6, delete "no" insert --to--.

Signed and Sealed this

Tenth Day of November 1998

Attest:

BRUCE LEHMAN

Attesting Officer

Commissioner of Patents and Trademarks